United States Patent
Smithson

(10) Patent No.: US 9,097,101 B2
(45) Date of Patent: Aug. 4, 2015

(54) SYSTEM AND METHOD FOR MEASUREMENT INCORPORATING A CRYSTAL RESONATOR

(75) Inventor: Mitchell Carl Smithson, Pasadena, TX (US)

(73) Assignee: CHEVRON U.S.A INC., San Ramon, CA (US)

( * ) Notice: Subject to any disclaimer, the term of this patent is extended or adjusted under 35 U.S.C. 154(b) by 476 days.

(21) Appl. No.: 13/434,332

(22) Filed: Mar. 29, 2012

(65) Prior Publication Data

US 2013/0257435 A1 Oct. 3, 2013

(51) Int. Cl.
| | |
|---|---|
| *E21B 47/06* | (2012.01) |
| *G01V 3/30* | (2006.01) |
| *E21B 47/09* | (2012.01) |

(52) U.S. Cl.
CPC ............ *E21B 47/06* (2013.01); *E21B 47/0905* (2013.01); *G01V 3/30* (2013.01)

(58) Field of Classification Search
CPC ................... E21B 47/09–47/091; G01V 3/30
USPC .......................................... 324/333–343, 346
See application file for complete search history.

(56) References Cited

U.S. PATENT DOCUMENTS

| | | | |
|---|---|---|---|
| 2,607,220 A | | 8/1952 | Martin |
| 3,079,550 A | * | 2/1963 | Huddleston, Jr. et al. .... 324/371 |
| 3,181,057 A | * | 4/1965 | Bravenec ....................... 324/373 |
| 5,672,971 A | * | 9/1997 | Meador et al. ................ 324/338 |
| 5,682,099 A | * | 10/1997 | Thompson et al. ........... 324/338 |
| 6,072,997 A | * | 6/2000 | Kawai ............................ 455/214 |
| 6,598,481 B1 | * | 7/2003 | Schultz ............................ 73/702 |
| 6,646,479 B1 | * | 11/2003 | Crawford ........................ 327/72 |
| 2003/0010491 A1 | * | 1/2003 | Collette ........................ 166/65.1 |
| 2007/0235184 A1 | * | 10/2007 | Thompson et al. ...... 166/250.01 |
| 2008/0174409 A1 | * | 7/2008 | Frank ........................... 340/10.4 |
| 2008/0253230 A1 | * | 10/2008 | Thompson et al. ........... 367/129 |
| 2011/0018734 A1 | * | 1/2011 | Varveropoulos et al. .. 340/853.7 |
| 2011/0267065 A1 | | 11/2011 | Bloys et al. |
| 2013/0220598 A1 | * | 8/2013 | Palumbo et al. .............. 166/249 |

FOREIGN PATENT DOCUMENTS

| | | |
|---|---|---|
| WO | WO 2008/082302 | 7/2008 |
| WO | WO 2009/032899 | 3/2009 |

OTHER PUBLICATIONS

International Search Report dated Jan. 30, 2014.

* cited by examiner

*Primary Examiner* — Patrick Assouad
*Assistant Examiner* — Demetrius Pretlow
(74) *Attorney, Agent, or Firm* — Pillsbury Winthrop Shaw Pittman, LLP

(57) ABSTRACT

A system, method and device for interrogating a downhole environment in a borehole beneath a surface includes a source of electromagnetic energy, operable to transmit an electromagnetic signal in the borehole, a sensor module, including a passive resonator having a resonant frequency that varies with changes in the condition in the downhole environment to reflect the electromagnetic signal and generates harmonic frequencies in response to a condition in the downhole environment in the borehole and a detector positionable to receive a returned electromagnetic signal. Embodiments include a filter to pass a harmonic of the resonant frequency of the resonating circuit and circuitry configured and arranged to measure the frequency of the harmonic signal.

20 Claims, 4 Drawing Sheets

SYSTEM AND METHOD FOR MEASUREMENT INCORPORATING A CRYSTAL RESONATOR

BACKGROUND

1. Field

The present invention relates generally to remote sensing and more particularly to sensing temperatures and/or pressures using a crystal resonator based sensor.

2. Background

In resource recovery, it may be useful to monitor various conditions at locations remote from an observer. In particular, it may be useful to provide for monitoring conditions at or near to the bottom of a borehole that has been drilled either for exploratory or production purposes. Because such boreholes may extend several miles, it is not always practical to provide wired communications systems for such monitoring.

SUMMARY

An aspect of an embodiment of the present invention includes a source of electromagnetic energy, operable to transmit an electromagnetic signal in the borehole, a sensor module, including a passive resonating circuit including a crystal having a resonant frequency that varies with changes in the condition in the downhole environment to return a harmonic of the excitation signal in response to a condition in the downhole environment in the borehole.

An aspect of an embodiment includes a detection unit that detects a portion of the returned electromagnetic signal that is in a frequency range including a harmonic of the resonant frequency of the crystal.

An aspect of an embodiment includes a directional coupler configured and arranged to transmit the electromagnetic energy from the source to the borehole and to pass the returned electromagnetic signal to a detection circuit including a filter that selects a harmonic of the resonant frequency and transmits the filtered signal to a discriminator that outputs a discriminated signal to a frequency counter.

An aspect of an embodiment includes directional coupler configured and arranged to transmit the electromagnetic energy from the source to the borehole and to pass a portion of the returned electromagnetic signal to a detection circuit including a filter that selects a harmonic of the resonant frequency and transmits the filtered signal to a superheterodyne receiver.

DESCRIPTION OF THE DRAWINGS

Other features described herein will be more readily apparent to those skilled in the art when reading the following detailed description in connection with the accompanying drawings, wherein.

DETAILED DESCRIPTION

Figure 1:
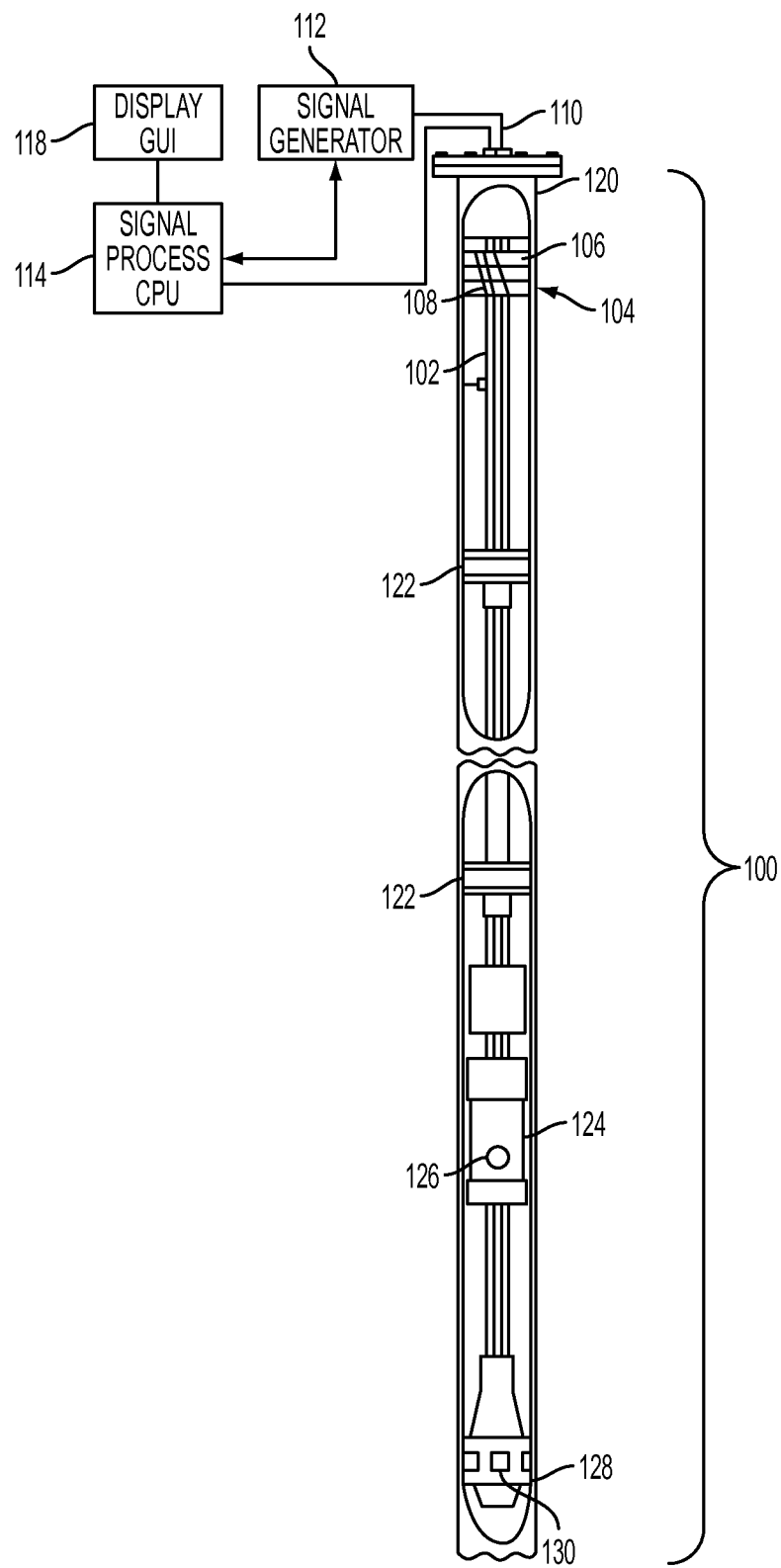
FIG. 1 is a schematic illustration of a system for interrogating a downhole environment in a borehole beneath a surface in accordance with an embodiment of the present invention.

FIG. 1 illustrates an example of an apparatus 100 for monitoring a condition in a subsurface borehole. The apparatus 100 includes an electromagnetically transmissive medium, such as a conductive line 102, for conducting electromagnetic energy through the borehole. It will be appreciated by those having ordinary skill in that art that the conductive line 102 may take different forms or embodiments, depending on the state of the borehole. Thus, for example, the conductive line 102 may comprise a production tubing string in a completed borehole or a drillstring in a borehole under construction. Near the top of the conductive line 102, a transformer 104 is provided to couple the conductive pipe to a source of electromagnetic energy. Alternate coupling methods to the transformer 104 may be employed. For example, a gap sub (i.e., a tubing sub assembly including electrical isolation features) in conjunction with the tubing string may form the transmission line which may directly couple to a coaxial cable or any other suitable cable.

In the example embodiment as shown, the transformer 104 includes a stack of ferrite rings 106, and a wire 108 wound around the rings. The wire 108 includes leads 110 that may be coupled to an oscillator 112 which may be configured to produce a continuous wave signal. The wire 108 may further be coupled to a receiver 114. The receiver 114 may be embodied as a computer that includes a bus for receiving signals from the apparatus 100 for storage, processing and/or display. In this regard, the computer 114 may be provided with a display 118 which may include, for example, a graphical user interface.

The computer 114 may be programmed to process the returned signal to provide a measure of the sensed characteristic. The computer 114 may perform any desired processing of the detected signal including, but not limited to, a statistical (e.g., Fourier) analysis of the modulated vibration frequency, a deconvolution of the signal, a correlation with another signal or the like. Commercial products are readily available and known to those skilled in the art that can be used to perform any suitable frequency detection. Alternately, the computer may be provided with a look-up table in memory or in accessible storage, that correlates received frequencies to sensed wellbore conditions.

In a typical drilling application, the borehole will be lined with a borehole casing 120 which is used to provide structural support to the borehole. This casing 120 is frequently made from a conductive material such as steel, in which case it will cooperate with the line 102 in order to form a coaxial transmission line, and it is not necessary to provide any additional conductive medium. Where the casing is not conductive, a conductive sleeve (not shown) may be provided within the casing in order to form the coaxial structure. In order to maintain a spacing between the line 102 and the casing 120, the apparatus 100 may include dielectric rings 122 disposed periodically along the conductive line 102.

The spacers can, for example, be configured as insulated centralizers which can be disks formed from any suitable material including, but not limited to, nylon or polytetrafluoroethylene (PTFE). Though the illustrated embodiment makes use of a coaxial transmission line, it is contemplated that alternate embodiments of a transmission line may be employed, such as a single conductive line, paired conductive lines, or a waveguide. For example, the casing alone may act as a waveguide for certain frequencies of electromagnetic waves. Furthermore, lengths of coaxial cable may be used in all or part of the line. Such coaxial cable may be particularly useful when dielectric fluid cannot be used within the casing 120 (e.g., when saline water or other conductive fluid is present in the casing 120).

A probe portion 124 is located near the distal end of the apparatus 100. In principle, the probe portion may be located at any point along the length of the transmission line. Indeed, multiple such probe portions may be placed at intervals along the length, though this would tend to create additional signal processing burdens in order to differentiate signals from the several probes. Setting a natural resonance frequency of each probe at a different frequency would, in principle, allow for a type of wavelength multiplexing on the coaxial line that could simplify the processing.

The probe portion includes a port 126 that is configured to communicate ambient pressures from fluid present in the borehole into the probe where it may be sensed by the sensor (not shown in FIG. 1). Below the probe is illustrated a packer 128 and packer teeth 130.

In use, the oscillator 112 generates an electromagnetic signal (sine wave) that is transmitted through the transmission line to the probe 124.

The probe includes a sensor that includes a resonant circuit portion that, upon receiving the excitation signal at or near the resonant frequency, the crystal will resonate at the resonant frequency and further produce harmonics at higher frequencies. These harmonics are electronically communicated to the transmission line.

Figure 2:
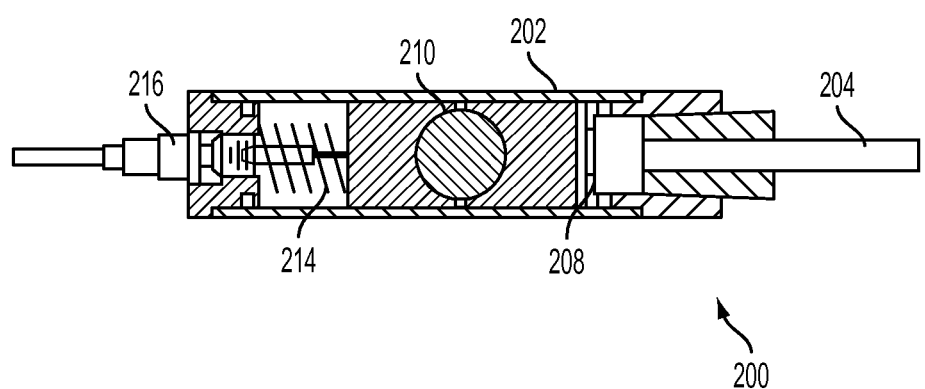
FIG. 2 is a schematic illustration of a sensor package incorporating a pressure or temperature sensor in accordance with an embodiment of the present invention.

The embodiment illustrated in FIG. 2 includes a crystal-based resonant sensor 200. The structure of the housing 202 has at one end a pressure feed-in tube 204 that allows pressure from the borehole environment that has entered via the port 126 to pass into an interior space 206 of the sensor 200. In the interior space, the pressure is transmitted to a flexible diaphragm 208 or otherwise pressure-reactive structure.

Motion of the diaphragm 208 is transmitted to a quartz crystal 210, or other piezoelectric crystal such as gallium phosphate. As pressure is transmitted to an edge of the quartz crystal, its resonant frequency changes. By correct selection of a direction of the face of the crystal, the sensor may be made to be more sensitive to pressure or to temperature (e.g., AC-cut). For pressure monitoring, the crystal should be preferentially sensitive to pressure and relatively less sensitive to temperature (e.g., AT-cut). Furthermore, some crystal cuts are more suitable for generating harmonics.

A return spring mechanism 214 may be provided to bias the crystal 210 and its holders towards the feed-in tube 204 and thereby to tend to cause the diaphragm to return to a neutral position. An electrical feed through 216 is provided to couple the sensor 200 to the sensor circuit (not shown).

Figure 3A:
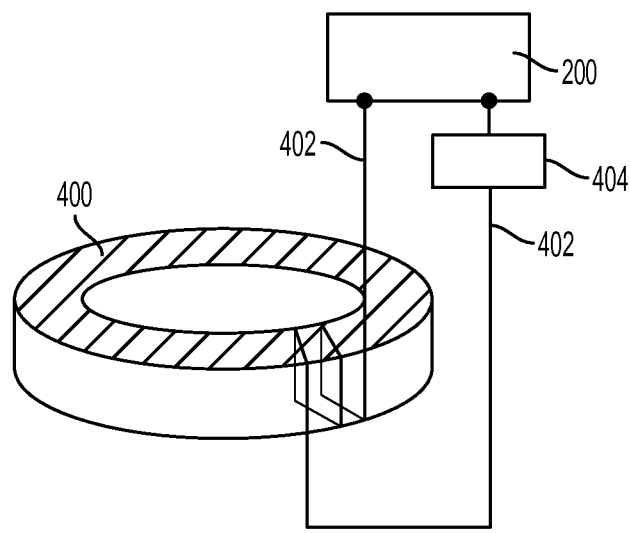
FIG. 3A is a schematic illustration of a circuit incorporating a crystal oscillator based sensor and a capacitive sensor in accordance with an embodiment of the present invention.
Figure 3:
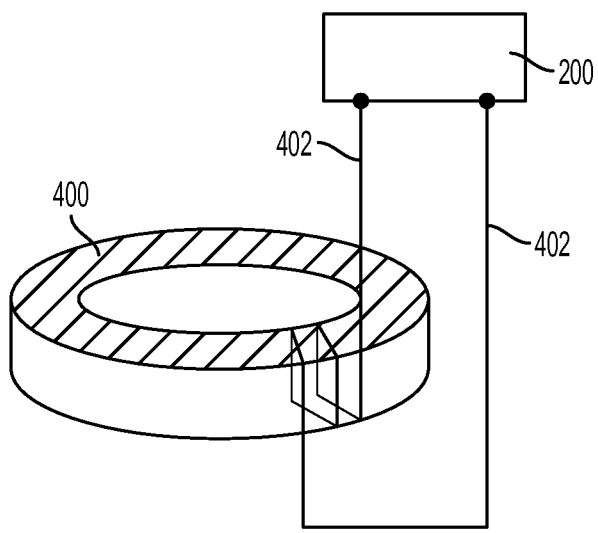
FIG. 3 is a schematic illustration of a circuit incorporating a crystal oscillator based sensor in accordance with an embodiment of the present invention.

The sensor 200 may be coupled to the transmission line via an inductive ferrite ring 400 as illustrated in FIG. 3. Electrical leads 402 are provided through the electrical feed through 216 of the sensor module. The leads 402 couple wire loops around the ferrite ring 400. In this embodiment, the ferrite ring essentially acts as a transformer to couple the signal to the transmission line.

FIG. 3A illustrates an alternate embodiment directed to a pressure sensor configuration. In this embodiment, the relatively temperature-insensitive crystal (e.g., AT cut crystal) is isolated from the ambient pressure, and a capacitive pressure-responsive element 404 is provided in series with the sensor 200' and exposed to the ambient pressure. In this configuration, the ferrite ring 400 again acts as a transformer. The crystal sensor 200' will resonate with a frequency that depends in large part on the capacitance of the capacitive sensor 404. In this case, the capacitive sensor acts to pull the base frequency of the crystal resonator as a function of the pressure sensed at the capacitor. Accordingly, the harmonics of the crystal will also be shifted.

Figure 4:
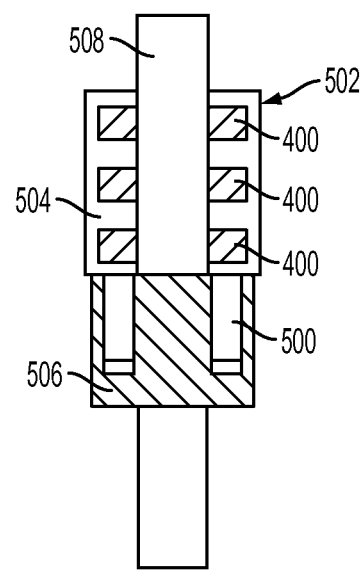
FIG. 4 is a schematic illustration of a package incorporating a plurality of sensors in accordance with one or more embodiments of the present invention.

FIG. 4 illustrates a package for sensors in accordance with embodiments of the present invention. A number of sensors 500 are disposed within a common housing 502. For each sensor 500, there is a corresponding ferrite ring 400, which is disposed in a portion 504 of the housing 502 that is made from a dielectric material, for example PTFE. While ordinarily there will be a one-to-one ratio of sensors to rings, it is also possible to have one ring correspond to two or even more sensors. As described above, the rings 400 couple the sensors to the transmission line 102. The sensors, in turn, are held in a metal block portion 506 of the sensor module. Tubing 508 is threaded into the metal block in order to positively locate the sensor package. In a typical application, this tubing may constitute either the production tubing itself, or an extension of the production string.

As will be appreciated, it is possible to combine pressure and temperature sensors in a single package, such that the temperature measurements may be used to help account for temperature related drift of the pressure sensor.

To account for variations in response that are well-dependent rather than temperature or pressure dependent, a calibration crystal sensor may be included along with the primary sensor. In this approach, the calibration crystal sensor is at a separate frequency from pressure and temperature sensors. The resulting sensor is isolated from the well impedance, eliminating well-dependent effects.

Another approach is to make use of a temperature insensitive crystal that is isolated from the ambient pressure, similar to that used in the pressure sensor of FIG. 3A. In this variation, the crystal signal, isolated from pressure and relatively insensitive to temperature, will only react to the particular electromagnetic transmission characteristics of the well in which it is positioned. Therefore, its output can be regarded as being representative of the well shift only, unaffected by the other environmental factors.

The inventors have determined that it is useful to monitor a higher order harmonic of the measurement signal rather than the primary measurement signal. In this regard, the inventors have found that in peak resonance measurements, the signal can be difficult to identify and separate from noise and/or non-resonant response of the system. This is particularly true in which the excitation frequency is not identically equal to the resonant frequency, resulting in relatively lower power response from the sensor. For example, as illustrated schematically in FIG. 5, the excitation frequency 600 is close to the resonant frequency 602. As shown, the two peaks are considerably different in amplitude. In practice, it can be that they differ by less than 0.1%. By way of example, a receiver may need to be able to distinguish 3.00056 W signal representing peak amplitude at resonance from a 3 W signal representing ordinary reactance of the system at a non-resonant frequency. Furthermore, it is subject to error because of additive noise and limitations of sweep rate vs. transmission line delay.

The oscillator can be selected to ensure strong response at the higher order harmonics. In particular, A-T cut crystals have a good response at odd-order harmonics (e.g., $3^{rd}$ harmonic 604, $5^{th}$ harmonic 606, $7^{th}$ harmonic, not shown, etc.).

Figure 5:
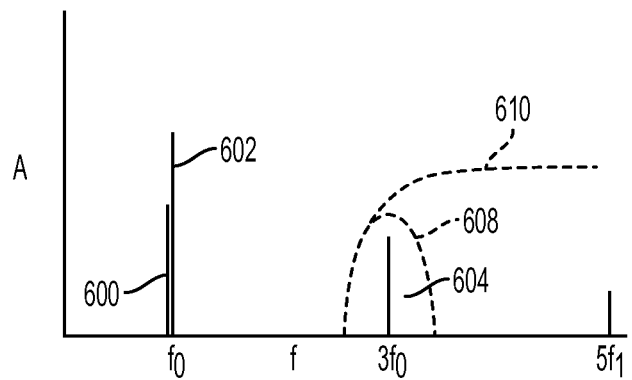
FIG. 5 is an amplitude v. frequency diagram comparing excitation frequency with resonant frequency signals and harmonics thereof in accordance with an embodiment of the present invention.

Referring to FIG. 5, when the sensor is excited by an excitation frequency 600, even one that is not quite at the resonant frequency, a return signal at the resonant frequency 602 is generated, along with its harmonics. Application of a band pass filter having a pass range 608 that includes the third harmonic 604 can cut the power detected from fundamental and excitation frequencies 602, 600 as well as attenuating the higher order harmonics including the $5^{th}$ harmonic 606. As an example, the band pass filter may be selected to pass a range of about 1 kHz in width, though it will be appreciated that this width depends at least in part on the resonant frequency to be monitored. Alternately, because higher order harmonics are naturally attenuated compared to the third order harmonic, a high pass filter 610 can achieve similar results, by attenuating the low frequencies including the fundamental 602. In either approach, detection of the third order harmonic is simplified compared to the detection of signal power. The detected harmonic frequency can then be directly correlated with the characteristic to be measured.

Figure 6:
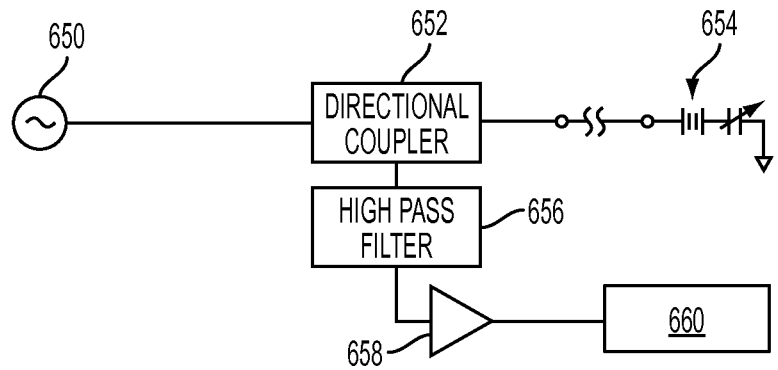
FIG. 6 is a schematic diagram of a detection circuit incorporating a directional coupler, filter and discriminator to generate digital pulses for measuring resonant frequency in accordance with an embodiment of the present invention.

Once the signal has been filtered to emphasize the harmonics, there are a number of approaches to detecting that signal. In a first approach, as illustrated in FIG. 6, an excitation source 650 produces an oscillation at a frequency at or near to the resonant frequency of the sensor. As will be appreciated, the excitation signal may be a programmable or swept frequency oscillator. Alternately, once a resonant frequency is determined, it may be useful to use the determined frequency as a control input to the excitation source in a frequency feedback loop to ensure that the input remains close to the resonant frequency.

The excitation signal passes through a directional coupler 652 and is transmitted to the sensor 654 where fundamental and harmonic resonance occurs and the signal is returned up the borehole. The directional coupler passes the returned signal to a high pass filter 656 which is selected to pass the desired harmonic of the fundamental signal while attenuating the fundamental frequency. In an embodiment, the high pass filter 656 may be instead a band pass filter that further attenuates harmonics other than the desired harmonic.

The filtered signal is processed by a discriminator 658 that may optionally include an amplifier and/or automatic gain control (AGC) functionality. The discriminator acts to compare a DC average signal level to an instantaneous signal. In an embodiment, this functionality is provided by an integrating capacitor and a comparator.

The discriminator 658 outputs a square wave (or substantially square wave) of digital pulses that correspond to the harmonic of the resonant frequency of the sensor and the pulses are measured by a counter 660. In an embodiment, the counter may be a frequency counter such as those available from Agilent Technologies of Santa Clara, Calif. Alternately, a microprocessor may provide the counting functionality. In an embodiment, the counter is able to count in the MHz range, and in particular, in the 1-5 MHz range and more particularly, about 3 MHz. The output may be, for example, a count per second (Hz), or counts over a given fraction of a second, signal and may be in digital form. As with other embodiments, the frequency output may be converted via a calibration formula to engineering units.

Figure 7:
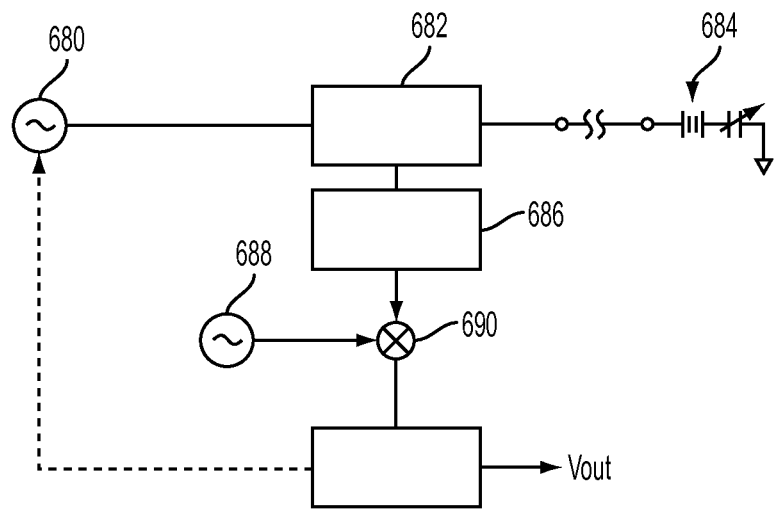
FIG. 7 is a schematic diagram of a detection circuit incorporating a superheterodyne detector for measuring resonant frequency in accordance with an embodiment of the present invention.

In another approach, illustrated in FIG. 7, an excitation source 680 produces an input signal that is near or equal to the resonant frequency of the sensor. As described above, the input may be swept or otherwise driven to ensure that it will pass through the region of the resonant frequency.

A directional coupler 682 passes the excitation signal to the sensor 684 where it is modulated and returned to the surface. The directional coupler 682 then passes the modulated signal to a band pass or high pass filter 686 that selectively passes a selected harmonic of the resonant frequency of the sensor 684 in a fashion similar to the foregoing embodiments. The output of the filter 686 is mixed with the output of a local oscillator 688 in a heterodyne mixer 690. The combined signal is then passed to a receiver 692 for detection.

The receiver 692 may be, for example, an FM intermediate frequency (IF) receiver, having a characteristic intermediate frequency of e.g., 10.7 MHz. In this embodiment, the local oscillator is configured and arranged to provide a 10.7 MHz signal for mixing with the harmonic to produce an output at the IF of the receiver 692. In general, the receiver may be configured to produce an analog voltage change proportional to the deviation of harmonic frequency of the sensor 684. A received signal strength indicator (RSSI) of the FM receiver 692 may be used to provide a feedback control to the excitation source 680. In an embodiment, the output voltage $V_{out}$ of the receiver is used to drive a current loop transmitter to transmit the system output to a data collection device such as SCADA system or programmable logic controller. For example a 4-20 mA transmitter may be useful in various embodiments.

As will be appreciated, commercially available FM receivers may be obtained that include the local oscillator, mixer, receiving circuitry and RSSI hardware in a single package. Alternately, some or all of the components (for example, the RSSI, FM discriminator, automatic gain control, etc.) may be separately embodied and may be custom designed for operation at the frequency to be received.

In embodiments using filters to select harmonics, it may be useful to employ signal splitters and corresponding band pass filters to allow for selection of a number of different frequency ranges. In this approach, each range can be considered as a channel corresponding to a selected one of a number of sensors located in the borehole. In this regard, each sensor of the group should be designed to return its modulated signal at a different resonance frequency from each other sensor so that the respective signals may be easily separated. While the receivers are generally described as being at the surface, it should be apparent that they may in principle be located at the surface of the earth, on a ship at sea, or at an intermediate depth in the earth or water, depending on the particular application.

Those skilled in the art will appreciate that the disclosed embodiments described herein are by way of example only, and that numerous variations will exist. Where the term "about" is applied to ranges, one of ordinary skill in the art will appreciate that, by way of example, a variation of ±10% may be implied. The invention is limited only by the claims, which encompass the embodiments described herein as well as variants apparent to those skilled in the art.

The invention claimed is:

1. A system for interrogating a downhole environment in a borehole beneath a surface, comprising:
   a source of electromagnetic energy, operable to transmit an electromagnetic signal in the borehole;
   a sensor module, comprising a passive resonating circuit having a resonant frequency that varies with changes in a condition in the downhole environment, such that the resonating circuit returns at least a portion of the electromagnetic signal along with harmonics of the resonant frequency in response to the condition in the downhole environment in the borehole;

a detector, positionable to receive the returned portion of the electromagnetic signal, the detector including a filter configured and arranged to attenuate a signal at the resonant frequency, and configured and arranged to pass a signal at a harmonic of the resonant frequency.

2. A system as in claim 1, further comprising a circuit configured and arranged to output a digital count at a frequency corresponding to a frequency of the harmonic.

3. A system as in claim 2, wherein the circuit configured and arranged to output a digital count comprises a discriminator that is configured and arranged to compare a DC portion of an average signal level to an instantaneous signal and to output digital pulses.

4. A system as in claim 3, wherein the discriminator comprises an integrating capacitor and a comparator.

5. A system as in claim 3, wherein the discriminator further comprises an amplifier and an automatic gain control.

6. A system as in claim 3, wherein the circuit configured and arranged to output a digital count further comprises a counter, in electrical communication with the discriminator, and configured and arranged to count the output digital pulses with respect to time to measure a frequency of the harmonic.

7. A system as in claim 2, further comprising a directional coupler, in electrical communication with the source of electromagnetic energy, the sensor module, and the detector, such that the transmitted electromagnetic signal passes through the directional coupler into the borehole and the returned modulated electromagnetic signal passes through the directional coupler to the detector.

8. A system as in claim 1, wherein the filter comprises a bandpass filter or a high pass filter.

9. A system as in claim 1, further compromising a superheterodyne receiver.

10. A system as in claim 9, wherein the superheterodyne receiver further comprises a received signal strength indicator, and an output of the received signal strength indicator is used as a control input to the source of electromagnetic energy.

11. A system as in claim 10, wherein the control input controls one or both of frequency and signal strength of the transmitted electromagnetic signal.

12. A system as in claim 9, wherein the superheterodyne receiver comprises a frequency modulated intermediate frequency receiver and the system further comprises:

a local oscillator; and a mixer, in electrical communication with the local oscillator, the filter, and the receiver, the local oscillator configured and arranged to output a signal at an intermediate frequency of the receiver to the mixer, the mixer being configured and arranged to mix the signal at the intermediate frequency of the receiver with the signal at the harmonic of the resonant frequency and to communicate a mixed, frequency converted signal to the receiver.

13. A system as in claim 9, further comprising a directional coupler, in electrical communication with the source of electromagnetic energy, the sensor module, and the receiver, such that the transmitted electromagnetic signal passes through the directional coupler into the borehole and the returned electromagnetic signal passes through the directional coupler to the receiver.

14. A system as in claim 9, wherein the filter comprises a bandpass filter or a high pass filter.

15. A method of interrogating a downhole environment in a borehole beneath a surface, comprising:

transmitting an electromagnetic signal in the borehole;

returning at least a portion of the electromagnetic signal along with harmonics of a resonant frequency of a sensor module comprising a passive resonating circuit, the resonant frequency varying with changes in a condition in the downhole environment, in response to the condition in the downhole environment in the borehole;

receiving the returned portion of the electromagnetic signal, with a detector; and filtering the received signal to attenuate the signal at the resonant frequency, and to pass a signal at a harmonic of the resonant frequency.

16. A method as in claim 15, further comprising, converting an analog output of the detector to a digital output.

17. A method as in claim 15, further comprising, comparing a DC portion of an average signal level to an instantaneous signal and outputting digital pulses in response, the output digital pulses corresponding to a frequency of the harmonic.

18. A method as in claim 15, wherein the filtering comprises filtering the received signal using a bandpass filter or a high pass filter.

19. A method as in claim 15, further comprising monitoring a received signal strength and controlling a source of the electromagnetic signal on the basis of the received signal strength.

20. A method as in claim 19, wherein the controlling comprises controlling one or both of frequency and signal strength of the transmitted electromagnetic signal.

\* \* \* \* \*